United States Patent
Han et al.

(10) Patent No.: US 9,939,587 B2
(45) Date of Patent: Apr. 10, 2018

(54) ON-CHIP OPTICAL FILTER COMPRISING FABRI-PEROT RESONATOR STRUCTURE AND SPECTROMETER

(71) Applicants: SAMSUNG ELECTRONICS CO., LTD., Suwon-si (KR); CALIFORNIA INSTITUTE OF TECHNOLOGY, Pasadena, CA (US)

(72) Inventors: Seunghoon Han, Suwon-si (KR); Yu Horie, Pasadena, CA (US); Andrei Faraon, Pasadena, CA (US); Amir Arbabi, Pasadena, CA (US)

(73) Assignees: SAMSUNG ELECTRONICS CO., LTD., Suwon-Si (KR); CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 15/249,608

(22) Filed: Aug. 29, 2016

(65) Prior Publication Data
US 2017/0059777 A1    Mar. 2, 2017

Related U.S. Application Data

(60) Provisional application No. 62/211,535, filed on Aug. 28, 2015.

(30) Foreign Application Priority Data

May 11, 2016    (KR) .................. 10-2016-0057826

(51) Int. Cl.
G02B 6/12    (2006.01)
G02B 6/293    (2006.01)
(Continued)

(52) U.S. Cl.
CPC ........ *G02B 6/29356* (2013.01); *G01J 3/1895* (2013.01); *G02B 5/201* (2013.01);
(Continued)

(58) Field of Classification Search
CPC ........... G02B 6/29356; G02B 6/29325; G02B 5/1809; G01J 3/1895
(Continued)

(56) References Cited

U.S. PATENT DOCUMENTS 7,858,921 B2    12/2010    Stanton et al.
8,189,643 B2     5/2012    Chang-Hasnain et al.
(Continued)

OTHER PUBLICATIONS

Horie et al., "High resolution on-chip optical filter array based on double sub-wavelength grating reflectors", T. J. Watson Laboratory of Applied Physics, Aug. 2015, pp. 1-4.
(Continued)

*Primary Examiner* — Jerry Blevins
(74) *Attorney, Agent, or Firm* — Sughrue Mion, PLLC

(57) ABSTRACT

An on-chip optical filter having Fabri-Perot resonators and a spectrometer may include a first sub-wavelength grating (SWG) reflecting layer and a second SWG reflecting layer facing each other. A plurality of Fabri-Perot resonators are formed by the first SWG reflecting layer and the second SWG reflecting layer facing each other. Each of the Fabri-Perot resonators may transmit light corresponding to a resonance wavelength of the Fabri-Perot resonator. The resonance wavelengths of the Fabri-Perot resonators may be determined according to duty cycles of grating patterns.

18 Claims, 8 Drawing Sheets

(51) Int. Cl.
*G01J 3/18* (2006.01)
*G02B 5/20* (2006.01)
*G02B 5/18* (2006.01)
*G02B 5/28* (2006.01)

(52) U.S. Cl.
CPC .......... *G02B 5/288* (2013.01); *G02B 6/29325* (2013.01); *G02B 5/1809* (2013.01); *G02B 5/281* (2013.01)

(58) Field of Classification Search
USPC .......................................................... 385/14
See application file for complete search history.

(56) References Cited

U.S. PATENT DOCUMENTS

| | | | |
|---|---|---|---|
| 8,223,339 | B1 | 7/2012 | Fralick et al. |
| 9,677,936 | B2 | 6/2017 | Han et al. |
| 2007/0172894 | A1* | 7/2007 | Genick ............... B01L 3/5085 435/7.2 |
| 2009/0116790 | A1* | 5/2009 | Mossberg .......... B29D 11/0074 385/37 |
| 2011/0292953 | A1* | 12/2011 | Liu ..................... H01S 5/06256 372/20 |
| 2012/0091552 | A1* | 4/2012 | Li ........................ G02B 5/1809 257/432 |
| 2014/0185980 | A1* | 7/2014 | Lei ..................... G02B 6/12004 372/20 |
| 2015/0117808 | A1* | 4/2015 | Chen ........................ G02B 6/30 385/2 |
| 2015/0219494 | A1 | 8/2015 | Hruska et al. |
| 2015/0323385 | A1 | 11/2015 | Han et al. |

OTHER PUBLICATIONS

Momeni et al: "Silicon nanophotonic devices for integrated sensing", Journal of Nanophotonics, vol. 3, 031001 (Apr. 1, 2009), pp. 1-23, (23 pages total).

Xia et al: "High resolution on-chip spectroscopy based on miniaturized microdonut resonators", Optics Express, vol. 19, No. 13, Jun. 20, 2011, pp. 12356-12364, (9 pages total).

Kyotuku et al: "Sub-nm resolution cavity enhanced microspectrometer", Optics Express, vol. 18, No. 1, Jan. 5, 2010, pp. 102-107, (6 pages total).

Gan et al: "A high-resolution spectrometer based on a compact planar two dimensional photonic crystal cavity array", Applied Physics Letters, 100, 231104 (2012), (4 pages total).

Wang et al: "Concept of a high-resolution miniature spectrometer using an integrated filter array", Optics Letters, vol. 32, No. 6, Mar. 15, 2007, pp. 632-634, (3 pages total).

Wang et al: "High resolution 3D NanoImprint technology: Template fabrication, application in Fabry-Pérot-filter-array-based optical nanospectrometers", Microelectronic Engineering,110, (2013), pp. 44-51, (8 pages total).

Xiao et al: "Fabrication of CMOS-compatible optical filter arrays using gray-scale lithography", J. Micromech. Microeng. 22 (2012) 025006, pp. 1-5, (6 pages total).

Fattal et al: "Flat dielectric grating reflectors with focusing abilities", Nature Photonics, vol. 4, Jul. 2010, www.nature.com/naturephotonics, pp. 466-470, (5 pages total).

Mateus et al: "Ultrabroadband Mirror Using Low-Index Cladded Subwavelength Grating", IEEE Photonics Technology Letters, vol. 16, No. 2, Feb. 2004, pp. 518-520, (3 pages total).

Karagodsky et al: "Theoretical analysis of subwavelength high contrast grating reflectors", Optics Express, vol. 18, No. 16, Aug. 2, 2010, pp. 16973-16988, (16 pages total).

Karagodsky et al: "Physics of near-wavelength high contrast gratings", Optics Express, vol. 20, No. 10, May 7, 2012, pp. 10888-10895, (8 pages total).

Liu et al: "S4: A free electromagnetic solver for layered periodic structures", Computer Physics Communications 183 (2012) pp. 2233-2244, (12 pages total).

Ricciardi et al: "Broadband Mirrors in the Near-Infrared Based on Subwavelength Gratings in SOI", vol. 2, No. 5, Oct. 2010, pp. 696-702, (8 pages total).

Quiang et al: "Design of Fano Broadband Reflectors on SOI", IEEE Photonics Technology Letters, vol. 22, No. 15, Aug. 1, 2010, pp. 1108-1110, (3 pages total).

* cited by examiner

ON-CHIP OPTICAL FILTER COMPRISING FABRI-PEROT RESONATOR STRUCTURE AND SPECTROMETER

CROSS-REFERENCE TO RELATED APPLICATIONS

This application claims priority from U.S. Provisional Application No. 62/211,535, filed on Aug. 28, 2015 in the US Patent Office and Korean Patent Application No. 10-2016-0057826, filed on May 11, 2016 in the Korean Intellectual Property Office, the disclosures of which are incorporated herein by reference in their entireties.

This invention was made with government support under Grant No. W911NF-14-1-0345 awarded by the U.S. Army and under Grant No. DE-SC0001293 awarded by the Department of Energy. The government has certain rights in the invention.

BACKGROUND

1. Field

Apparatuses and methods consistent with exemplary embodiments relate to On-chip optical filters including a Fabri-Perot resonator structure and spectrometers.

2. Description of the Related Art

A spectrometer is an important instrument in the field of optics. A spectrometer of the related art includes various optical devices, and thus, is heavy in weight. Recently, according to the miniaturization of related applications, such as smart phones or wearable devices, the miniaturization of a spectrometer is also required. In particular, an on-chip structure is useful since an integrated circuit and an optical device may be simultaneously realized on a single semiconductor chip. Therefore, research has been conducted on an optical device having an on-chip structure and a spectrometer.

SUMMARY

One or more exemplary embodiments provide on-chip optical filters configured to transmit light corresponding to a resonance wavelength of a Fabri-Perot resonator by including a Fabri-Perot resonator structure and spectrometers.

According to an aspect of an exemplary embodiment, there is provided an on-chip optical filter including: a first sub-wavelength grating (SWG) reflecting layer including a plurality of first sub-wavelength reflecting units, each of the first sub-wavelength reflecting units including a plurality of first reflectors that are spaced apart from each other at a regular interval, and a refractive index of the first reflectors being greater than a refractive index of a material surrounding the first reflectors; and a second SWG reflecting layer including a plurality of second sub-wavelength reflecting units, each of the second sub-wavelength reflecting units including a plurality of second reflectors that are spaced apart from each other at a regular interval and spaced apart from the first SWG reflecting layer, a refractive index of the second reflectors being greater than a refractive index of a material surrounding the second reflectors. The plurality of first sub-wavelength reflecting units and the plurality of second sub-wavelength reflecting units are aligned to face each other and operate as a plurality of Fabri-Perot resonators. Each of the Fabri-Perot resonators transmits light of a resonance wavelength set in advance.

When the Fabri-Perot resonators are distinguished by i, the first sub-wavelength reflecting units and the second sub-wavelength reflecting units that correspond to i and face each other one by one may have duty cycles satisfying a following Equation:

$$(2*n_i*d_i)/\lambda_i + \varphi_{1i} + \varphi_{2i} = 2\pi*m$$

wherein, i represents an integer, $n_i$ represents a refractive index between the first sub-wavelength reflecting unit and the second sub-wavelength reflecting unit corresponding to i, $d_i$ represents a distance between the first sub-wavelength reflecting unit and the second sub-wavelength reflecting unit corresponding to i, $\lambda_1$ represents a resonance wavelength of a Fabri-Perot resonator corresponding to i, $\varphi_{1i}$ represents a reflection phase at a reflection surface of the first sub-wavelength reflecting unit corresponding to i, $\varphi_{2i}$ represents a reflection phase of the second sub-wavelength reflecting unit corresponding to i, and m represents an integer.

The first sub-wavelength reflecting units may have different duty cycles from each other, and the second sub-wavelength reflecting units may have different duty cycles from each other.

The first SWG reflecting layer and the second SWG reflecting layer may be spaced apart from each other by a constant gap.

The first reflectors may have a same thickness, and the second reflectors may have a same thickness.

When the Fabri-Perot resonators are distinguished by i, the first reflectors and the second reflectors corresponding to i may satisfy following Equations:

$$2\lambda_i/3 \geq h_1 \geq \lambda_i/15$$

$$2\lambda_i/3 \geq h_2 \geq \lambda_i/15$$

wherein, i represents an integer, $h_1$ represents a thicknesses of the first reflectors, $h_2$ represents a thicknesses of the second reflectors, and $\lambda_1$ represents a resonance wavelength of a Fabri-Perot resonator corresponding to i.

The first sub-wavelength reflecting units may be one dimensionally arranged, and the second sub-wavelength reflecting units are one dimensionally arranged.

The on-chip optical filter may further include a polarizing filter on the first SWG reflecting layer or the second SWG reflecting layer.

The first SWGs may be two dimensionally arranged and the second SWGs may be two dimensionally arranged.

According to an aspect of another embodiment, there is provided an on-chip optical filter including: a first SWG reflecting layer including a plurality of first grating patterns that satisfy a sub-wavelength grating condition; a second SWG reflecting layer that includes a plurality of second grating patterns that satisfy the sub-wavelength grating condition and is spaced apart from the first SWG reflecting layer, the plurality of second grating patterns being aligned with the plurality of first grating patterns to face each other to operate as Fabri-Perot resonators; and a cavity layer between the first SWG reflecting layer and the second SWG reflecting layer.

When first gratings of the plurality of first grating patterns and second gratings of the plurality of second grating patterns that face each other one by one are distinguished by i, the first gratings and the second grating patterns satisfy a following:

$$(2*n*d)/\lambda_i + \varphi_{1i} + \varphi_{2i} = 2\pi*m$$

wherein, i represents an integer, n represents a refractive index of the cavity layer, d represents a thickness of the cavity layer, $\lambda_1$ represents a resonance wavelength of a Fabri-Perot resonator corresponding to i, $\varphi_{1i}$ represents a reflection phase at a reflection surface of the first grating pattern corresponding to i, $\varphi_{2i}$ represents a reflection phase of the second grating pattern corresponding to i, and m represents an integer.

The first gratings may have different duty cycles from each other, and the second gratings may have different duty cycles from each other.

The first gratings may have a same thickness, and the second gratings may have a same thickness.

The first gratings may be one dimensionally arranged, and the second gratings may be one dimensionally arranged.

The on-chip optical filter may further include a polarizing filter on the first gratings or the second gratings.

The first gratings may be two dimensionally arranged, and the second gratings may be two dimensionally arranged.

According to an aspect of another embodiment, a spectrometer includes: an on-chip optical filter described above and a sensor layer configured to receive light passing through the on-chip optical filter for each wavelength.

BRIEF DESCRIPTION OF THE DRAWINGS

The above and/or other aspects will be more apparent by describing certain embodiments, with reference to the accompanying drawings, in which.

DETAILED DESCRIPTION

Figure 1:
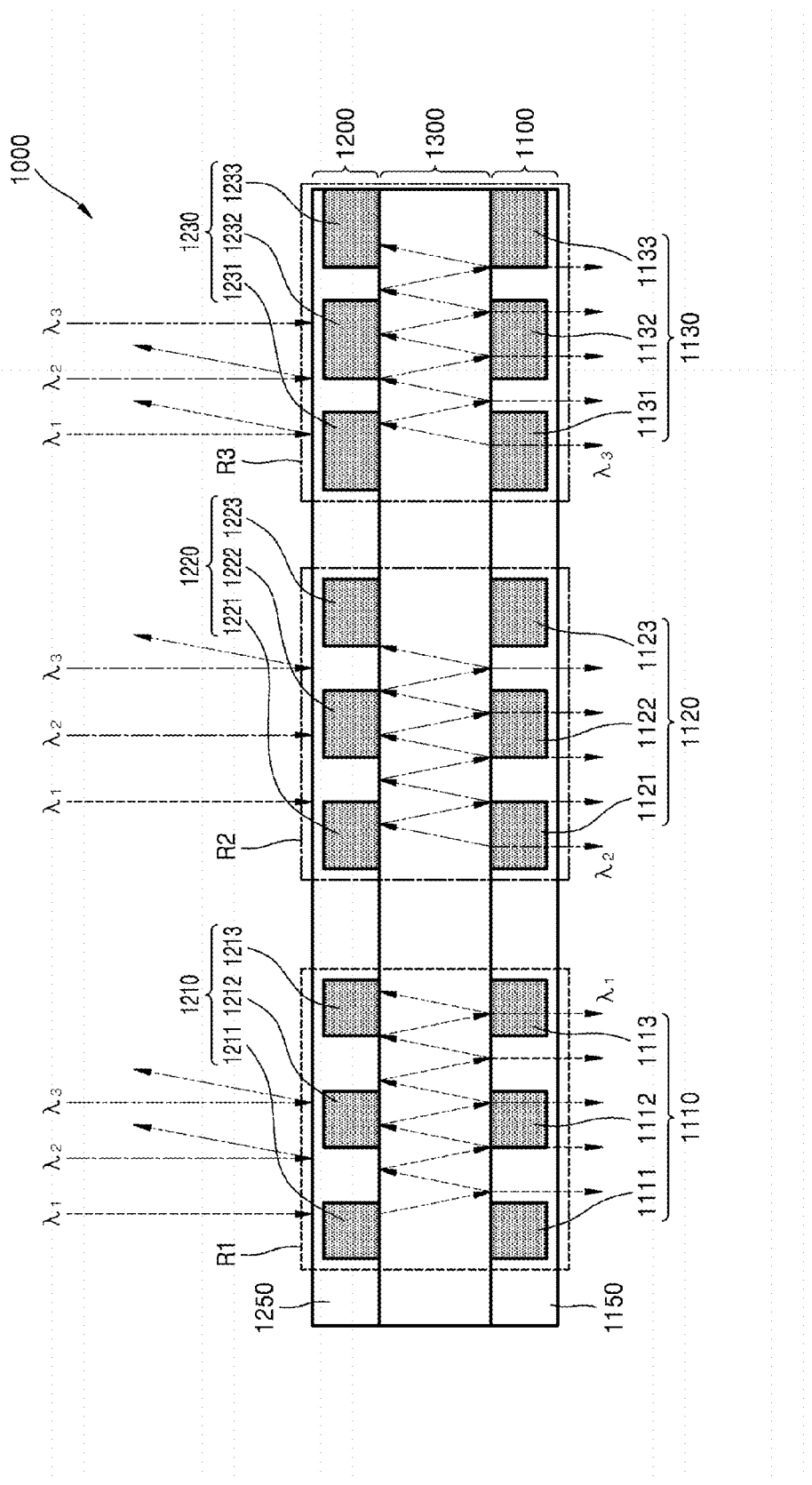
FIG. 1 is a schematic cross-sectional view of an on-chip optical filter according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

It should be understood that, when a part "comprises" or "includes" an element in the specification, unless otherwise defined, it is not excluding other elements but may further include other elements.

It will be understood that when a constituent element is referred to as being "on" another constituent element, it may include the cases when the constituent element is directly or indirectly on the other constituent element.

Figure 2:
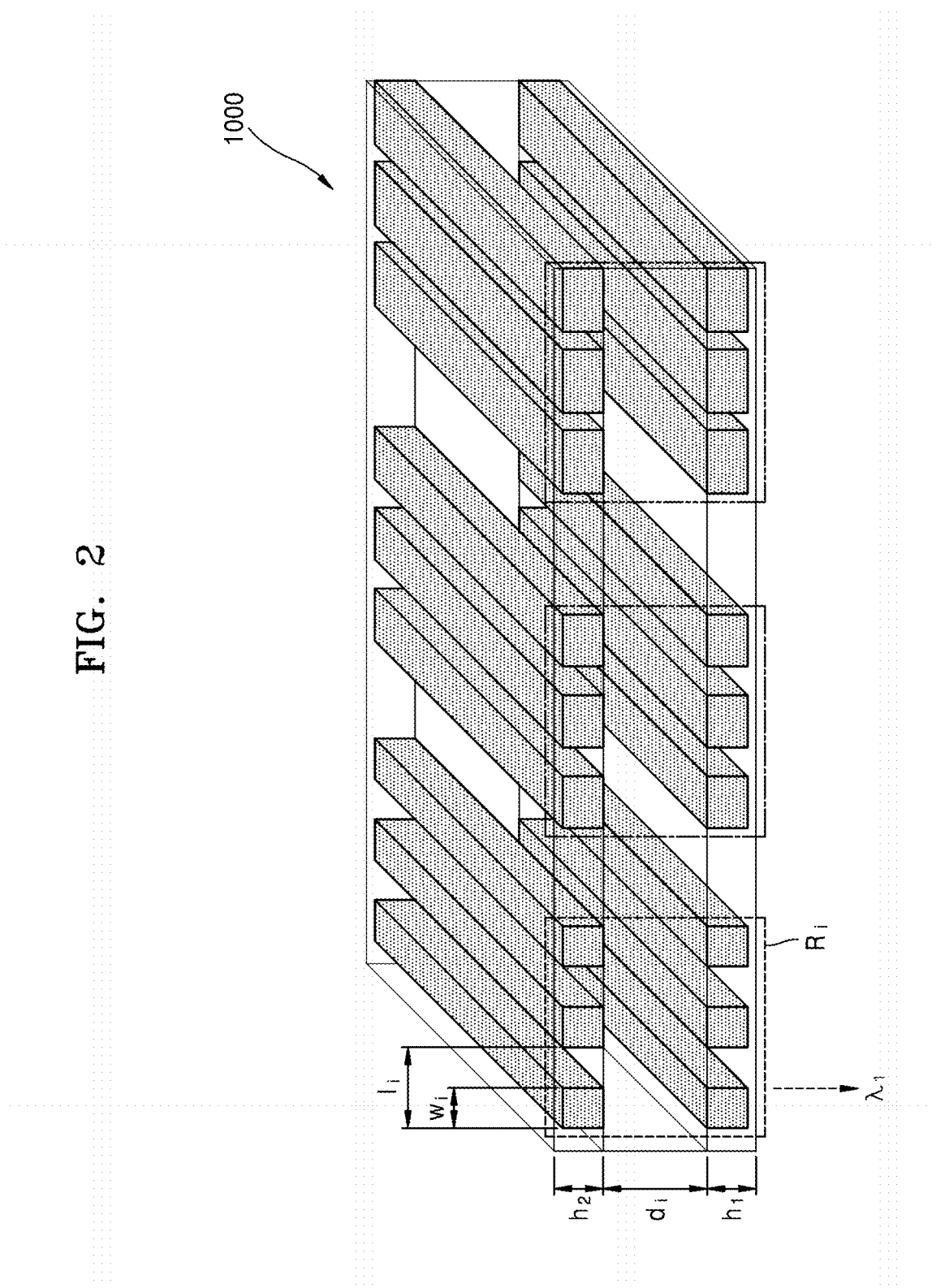
FIG. 2 is a schematic perspective view of the on-chip optical filter of FIG. 1.

FIG. 1 is a schematic cross-sectional view of an on-chip optical filter 1000 according to an exemplary embodiment. FIG. 2 is a schematic perspective view of the on-chip optical filter 1000 of FIG. 1.

Referring to FIGS. 1 and 2, the on-chip optical filter 1000 may include a first sub-wavelength grating (SWG) reflecting layer 1100 and a second SWG reflecting layer 1200 facing the first SWG reflecting layer 1100. The on-chip optical filter 1000 may have an on-chip structure that is integrated on a single semiconductor chip.

The on-chip optical filter 1000 may include a plurality of Fabri-Perot resonators formed by the first SWG reflecting layer 1100 and the second SWG reflecting layer 1200 facing each other. The Fabri-Perot resonators may be distinguished by "i". The "i" may be a promise for specifying the Fabri-Perot resonators. For example, an "i" is an arbitrary number or letter. Hereinafter, for convenience of explanation, "i" is expressed as an integer, but is not limited thereto.

The Fabri-Perot resonator has a structure in which two reflectors having high reflectivity face each other with a cavity therebetween. Light entered in the cavity reciprocally reflects between the two reflectors facing each other, and generates constructive and destructive interference. At this point, the light having a resonance wavelength may be transmitted through the Fabri-Perot resonator by satisfying the constructive interference. The performance of the Fabri-Perot resonator may be increased by transmitting light of a narrowband from a corresponding resonance wavelength. The performance of the Fabri-Perot resonator may be defined by a quality factor Q.

A reflector that constitutes the Fabri-Perot resonator may include, for example, a metal mirror, a Bragg reflecting surface, or a sub-wavelength reflecting surface. A Fabri-Perot resonator having a metal mirror may have a simple structure. However, the metal mirror may not be appropriate to reflect light of a wideband wavelength range or to have the Fabri-Perot resonator structure due to low reflectivity. A Fabri-Perot resonator having a Bragg reflecting surface may reflect light of a specific wavelength. However, the Bragg reflecting surface has a larger thickness, compared to the sub-wavelength reflecting surface, and has a complicated manufacturing process, and thus, may incur high costs. A Fabri-Perot resonator having the sub-wavelength reflecting surface has a relatively small thickness, compared to the Fabri-Perot resonator having a Bragg reflecting surface, and thus, has a small volume. Also, the Fabri-Perot resonator having a Bragg reflecting surface has a high filter characteristic due to its narrow bandwidth, and the resonance wavelength thereof is easily controlled. Accordingly, an on-chip optical filter having a sub-wavelength reflecting surface and a spectrometer may be advantageous over an on-chip optical filter having a metal mirror and a Bragg reflecting surface and a spectrometer.

The first SWG reflecting layer 1100 may include a plurality of first sub-wavelength reflecting units 1110, 1120, and 1130. Referring to FIG. 1, three first sub-wavelength reflecting units 1110, 1120, and 1130 are depicted as an example. However, various numbers of first sub-wavelength reflecting units 1110, 1120, and 1130 may be provided according to design.

The first sub-wavelength reflecting units 1110, 1120, and 1130 may be arranged in the first SWG reflecting layer 1100. For example, the first sub-wavelength reflecting units 1110, 1120, and 1130 may be one-dimensionally arranged. Referring to FIGS. 1 and 2, the first sub-wavelength reflecting units 1110, 1120, and 1130 are arranged in parallel to each other.

Each of the first sub-wavelength reflecting units 1110, 1120, and 1130 may correspond to a Fabri-Perot resonator. For example, the first sub-wavelength reflecting unit 1110 may correspond to a Fabri-Perot resonator R1 of an index 1. For example, the first sub-wavelength reflecting unit 1120 may correspond to a Fabri-Perot resonator R2 of an index 2. For example, the first sub-wavelength reflecting unit 1130 may correspond to a Fabri-Perot resonator R3 of an index 3.

The first sub-wavelength reflecting units 1110, 1120, and 1130 may respectively transmit light of corresponding one of a plurality of wavelengths $\lambda_1$, $\lambda_2$, and $\lambda_3$ and may reflect light of the other wavelengths. In detail, the first sub-wavelength reflecting unit 1110 may transmit the wavelength $\lambda_1$ corresponding to the center of a transmission band transmitted. The first sub-wavelength reflecting unit 1110 may include a plurality of first reflectors 1111, 1112, and 1113. Each of the first reflectors 1111, 1112, and 1113 has a refractive index greater than refractive indexes of adjacent first reflectors. Hereinafter, for convenience of explanation, the first sub-wavelength reflecting unit 1110 and the first reflectors 1111, 1112, and 1113 will be described, and the same descriptions may be applied to the first sub-wavelength reflecting units 1120 and 1130 and other first reflectors 1121, 1122, 1123, 1131, 1132, and 1133.

Referring to FIG. 1, the three first reflectors 1111, 1112, and 1113 are periodically and separately provided with respect to the first sub-wavelength reflecting unit 1110 as an example, and thus, various numbers of first reflectors 1111, 1112, and 1113 may be provided according to design. Since the first reflectors 1111, 1112, and 1113 are periodically separated, the first sub-wavelength reflecting unit 1110 may have a constant duty cycle.

The first reflectors 1111, 1112, and 1113 may have a refractive index greater than that of surrounding units that surround the first reflectors 1111, 1112, and 1113. For example, the first reflectors 1111, 1112, and 1113 may have a refractive index greater than that of a cavity layer 1300. The first reflectors 1111, 1112, and 1113 may have a refractive index greater than that of a first surrounding unit 1150.

The sub-wavelength reflecting unit 1110 may have an arrangement of the first reflectors 1111, 1112, and 1113 that satisfies a sub-wavelength grating condition. The sub-wavelength grating condition may denote that a distance $I_1$ between the neighboring first reflectors 1111 and 1112 is less than a wavelengths $\lambda_1$ of corresponding light, that is, $I_1 < \lambda_1$. The distance $I_1$ may also be referred to a pitch. The first sub-wavelength reflecting units 1120 and 1130, which respectively correspond to wavelengths $\lambda_2$ and $\lambda_3$, may also satisfy the condition, that is, $I_2 < \lambda_2$ and $I_3 < \lambda_3$.

The arrangement of the first reflectors 1111, 1112, and 1113 of the first sub-wavelength reflecting unit 1110 that satisfies the sub-wavelength grating condition may correspond to a sub-wavelength grating. The sub-wavelength grating may be determined based on the shape, thickness, and arrangement distances of the first reflectors 1111, 1112, and 1113. For example, the first reflectors 1111, 1112, and 1113 may have a bar shape elongated in a direction, and a cross-sectional view taken in a perpendicular direction to the first reflectors 1111, 1112, and 1113 having a bar shape elongated in the direction may be a polygonal shape, such as a square shape, a rectangular shape, or a triangular shape. For example, the first reflectors 1111, 1112, and 1113 may have a regular hexahedron shape, a rectangular parallelepiped shape, a cylindrical shape, or an elliptic cylindrical shape.

The wavelength $\lambda_1$ of corresponding light may be changed according to the thickness and duty cycle of the first reflectors 1111, 1112, and 1113 of the first sub-wavelength reflecting unit 1110. For example, the first reflectors 1111, 1112, and 1113 may have different thicknesses or the same thickness $h_1$. For example, the thickness $h_1$ of the first reflectors 1111, 1112, and 1113 may satisfy $2\lambda_i/3 \geq h_1 \geq \lambda_i/15$. The first sub-wavelength reflecting unit 1110 that satisfies the condition may have a high quality factor.

The first reflectors 1111, 1112, and 1113 having the same thickness are advantageous from a process point of view. For example, among the factors that determines a resonance wavelength $\lambda_1$, it may be easier to control a duty cycle than a thickness. For example, the duty cycle may be controlled by changing a mask pattern. When the first reflector 1111 is separated from the first reflector 1112 by $I_1$, a width may be $w_1$. At this point, a duty cycle of the first sub-wavelength reflecting unit 1110 may be $w_1/I_1$. Likewise, duty cycles of the first sub-wavelength reflecting units 1120 and 1130 may be $w_2/I_2$ and $w_3/I_3$, respectively. For example, the duty cycles $w_1/I_1$, $w_2/I_2$, $w_3/I_3$ of the first sub-wavelength reflecting units 1110, 1120, and 1130 respectively may be factors for determining wavelengths $\lambda_1$, $\lambda_2$, and $\lambda_3$ of corresponding light.

Materials of the first reflectors 1111, 1112, and 1113 may include at least one of Si, GaAs, GaP, SiN, and $TiO_2$, which have high refractive indexes. Material of the first surrounding unit 1150 may include at least one of $SiO_2$, a polymer group material (SU-8, PMMA), and hydrogen silsesquioxane (HSQ).

The second SWG reflecting layer 1200 may include a plurality of second sub-wavelength reflecting units 1210, 1220, and 1230. The second sub-wavelength reflecting units 1210, 1220, and 1230 may be respectively arranged to face the first sub-wavelength reflecting units 1110, 1120, and 1130. The descriptions of the second sub-wavelength reflecting units 1210, 1220, and 1230 and second reflectors 1211, 1212, 1213, 1221, 1222, 1223, 1231, 1232, and 1233 may be substantially the same as the descriptions of the first sub-wavelength reflecting unit 1110 and the first reflectors 1111, 1112, and 1113, and thus, the descriptions thereof will not be repeated.

Each of the second sub-wavelength reflecting units 1210, 1220, and 1230 may correspond to Fabri-Perot resonators. For example, the second sub-wavelength reflecting unit 1210 may correspond to a Fabri-Perot resonator R1 of an index 1, the second sub-wavelength reflecting unit 1220 may correspond to a Fabri-Perot resonator R2 of an index 2, and the second sub-wavelength reflecting unit 1230 may correspond to a Fabri-Perot resonator R3 of an index 3.

The second sub-wavelength reflecting units 1210, 1220, and 1230 may be arranged in the second SWG reflecting layer 1200. The second sub-wavelength reflecting units 1210, 1220, and 1230 may be arranged as the same type as the first sub-wavelength reflecting units 1110, 1120, and 1130 to respectively face the first sub-wavelength reflecting units 1110, 1120, and 1130.

The second sub-wavelength reflecting unit 1210 may include second reflectors 1211, 1212, and 1213 having refractive indexes greater than that of a surrounding unit. For example, the second reflectors 1211, 1212, and 1213 may have refractive indexes greater than that of a second surrounding unit 1250. For example, the second reflectors 1211, 1212, and 1213 may have refractive indexes greater than that of the cavity layer 1300.

The second sub-wavelength reflecting unit 1210 may have an arrangement of the second reflectors 1211, 1212, and 1213 that satisfies a sub-wavelength grating condition. The second sub-wavelength reflecting units 1220 and 1230 may have a structure similar to that of the sub-wavelength reflecting unit 1210. For example, the second sub-wavelength reflecting units 1210, 1220, and 1230 may satisfy the conditions of $I_1' < \lambda_1'$, $I_2' < \lambda_2'$, and $I_3' < \lambda_3'$. The duty cycles of the second sub-wavelength reflecting units 1210, 1220, and 1230 may be $w_1'/I_1'$, $w_2'/I_2'$, and $w_3'/I_3'$. The second sub-wavelength reflecting units 1210, 1220, and 1230 may be aligned with the first sub-wavelength reflecting units 1110, 1120, and 1130 in a direction of incident light.

The wavelength $\lambda_1'$ of corresponding light may be changed according to the thickness and duty cycle of the second reflectors 1211, 1212, and 1213 of the second sub-wavelength reflecting unit 1210. For example, the second reflectors 1211, 1212, and 1213 may have different thicknesses or the same thickness $h_2$. For example, the thicknesses of the second reflectors 1211, 1212, and 1213 may satisfy the condition of $2\lambda_r/3 \geq h_2 \geq \lambda_r/15$. The second sub-wavelength reflecting unit 1210 that satisfies the above condition may have a high quality factor.

The second reflectors 1211, 1212, and 1213 having the same thickness is advantageous from a process point of view. For example, the second reflectors 1211, 1212, and 1213 may have the same thickness as the thickness of the first reflectors 1111, 1112, and 1113 that face each other, but the thickness is not limited thereto. For example, when the second reflectors 1211, 1212, and 1213 have a thickness $h_2$ and the first reflectors 1111, 1112, and 1113 have a thickness $h_1$, a relationship of $h_1 = h_2$ may be satisfied or the $h_1$ and $h_2$ may be different from each other.

Materials of the second reflectors 1211, 1212, and 1213 may include at least one of Si, GaAs, GaP, SiN, and $TiO_2$, which have high refractive indexes. Material of the second surrounding unit 1250 may include at least one of $SiO_2$, a polymer group material (SU-8, PMMA), and HSQ.

The cavity layer 1300 may be provided between the first SWG reflecting layer 1100 and the second SWG reflecting layer 1200. For example, the cavity layer 1300 may have a constant thickness $d_i$. For example, the cavity layer 1300 may have a refractive index less than those of the first reflectors 1111, 1112, and 1113 and the second reflectors 1211, 1212, and 1213. For example, the cavity layer 1300 may have the same refractive index as the first surrounding unit 1150 and the second surrounding unit 1250. For example, the cavity layer 1300 may include the same material used to form the first surrounding unit 1150 and the second surrounding unit 1250, but the material for forming the cavity layer 1300 is not limited thereto. For example, if the cavity layer 1300 includes a solid material having high refractive index, the cavity layer 1300 may be formed by a general semiconductor process. Accordingly, the cavity layer 1300 may be easily formed, and thus, manufacturing cost may be reduced. For example, the cavity layer 1300 may include a gas including air having a low refractive index or may be a vacuum. If the cavity layer 1300 includes a gas or vacuum, it is easy to change the thickness $d_i$ of the cavity layer 1300, and thus, the resonance wavelength of the Fabri-Perot resonator may be controlled to the thickness di. In this case, in order to change the thickness $d_i$ of the cavity layer 1300, a driving unit for controlling the locations of the first SWG reflecting layer 1100 and the second SWG reflecting layer 1200 may be additionally provided.

As described above, the first sub-wavelength reflecting units 1110, 1120, and 1130 and the second sub-wavelength reflecting units 1210, 1220, and 1230 may form a plurality of Fabri-Perot resonators by respectively facing each other. The first sub-wavelength reflecting units 1110, 1120, and 1130 and the second sub-wavelength reflecting units 1210, 1220, and 1230 may be aligned to face each other, but the aligning thereof is not limited thereto, that is, the first sub-wavelength reflecting units 1110, 1120, and 1130 and the second sub-wavelength reflecting units 1210, 1220, and 1230 may be somewhat misaligned. For convenience of explanation, the Fabri-Perot resonator R1 corresponding to i=1 will be described, and the description may also be applied to the Fabri-Perot resonators of other indexes.

The Fabri-Perot resonator Ri corresponding to i may satisfy the following Equation 1.

$$d_i \geq \lambda_i/2 \qquad \text{<Equation 1>}$$

Here, $\lambda_i$ is a resonance wavelength of the Fabri-Perot resonator Ri corresponding to index i, and d is a distance between a first sub-wavelength reflecting unit and a second sub-wavelength reflecting unit corresponding to index i.

For example, if a separation distance between the first SWG reflecting layer 1100 and the second SWG reflecting layer 1200 is constant, $d_i$ may be an integer which is not related to the index i and may be expressed as the thickness $d_i$ of the cavity layer 1300.

In this case, Equation 1 may be changed to Equation 1'.

$$d_i \geq \lambda_i/2 \qquad \text{<Equation 1'>}$$

Some of light of $\lambda_1$ corresponding to the resonance wavelength of the light entering the Fabri-Perot resonator R1 may transmit through the first sub-wavelength reflecting unit 1110. Light incident to the Fabri-Perot resonator R1 may be reciprocally traveled back and forth in the cavity layer 1300 by being reflected at the second sub-wavelength reflecting unit 1210 and being reflected at the first sub-wavelength reflecting unit 1110. A phase of the incident light may be changed by $\varphi_{1i}$ whenever the incident light is reflected at the first sub-wavelength reflecting unit 1110, and the phase may be changed by $\varphi_{2i}$ whenever the incident light is reflected at the second sub-wavelength reflecting unit 1210.

Of the light incident to the Fabri-Perot resonator Ri, the incident light that satisfies the following constructive interference equation may pass through the Fabri-Perot resonator Ri.

$$(2 * n_i * d_i)/\lambda_i + \varphi_{1i} + \varphi_{2i} = 2\pi * m \qquad \text{<Equation 2>}$$

Here, $n_i$ indicates the refractive index of the cavity layer 1300 of the Fabri-Perot resonator corresponding to index i, and $d_i$ indicates a distance between a first sub-wavelength reflecting unit 1110 and a second sub-wavelength reflecting unit 1210 corresponding to index i. $\lambda_1$ indicates a resonance wavelength of a Fabri-Perot resonator corresponding to index i, $\varphi_{1i}$ indicates a phase at a reflection surface of the first sub-wavelength reflecting unit 1110 corresponding to index i, $\varphi_{2i}$ indicates a phase at a reflection surface of the first sub-wavelength reflecting unit 1210 corresponding to index i, and m is an integer.

For example, if the separation distance between the first SWG reflecting layer 1100 and the second SWG reflecting layer 1200 is constant, Equation 2 may be changed as follows.

$$(2 * n_i * d)/\lambda_i + \varphi_{1i} + \varphi_{2i} = 2\pi * m \qquad \text{<Equation 2>}$$

Here, d indicates the thickness of the cavity layer 1300.

In order to control the resonance wavelength $\lambda_i$ of the Fabri-Perot resonator, four variables $n_i$, $d_i$ (or d), $\varphi_{1i}$, and $\varphi_{2i}$ may be controlled. Among the four variables, $\varphi_{1i}$ and $\varphi_{2i}$ may be determined based on duty cycles of the first sub-wavelength reflecting units 1110, 1120, and 1130 and the second sub-wavelength reflecting units 1210, 1220, and

1230. In the on-chip optical filter 1000 according to the exemplary embodiment, the resonance wavelength of the Fabri-Perot resonator may be controlled by controlling duty cycles of the first sub-wavelength reflecting units 1110, 1120, and 1130 and the second sub-wavelength reflecting units 1210, 1220, and 1230 while the thickness $d_i$ (or d) and the refractive index $n_i$ of the cavity layer 1300 are fixed. The duty cycles of the first sub-wavelength reflecting unit 1110 and the second sub-wavelength reflecting unit 1210 may be the same or may not be the same. If the duty cycles of the first sub-wavelength reflecting units 1110, 1120, and 1130 and the duty cycles of the second sub-wavelength reflecting units 1210, 1220, and 1230 satisfy Equation 2, the duty cycles thereof are sufficient, which will be described below with reference to FIGS. 3 and 4.

Figure 3:
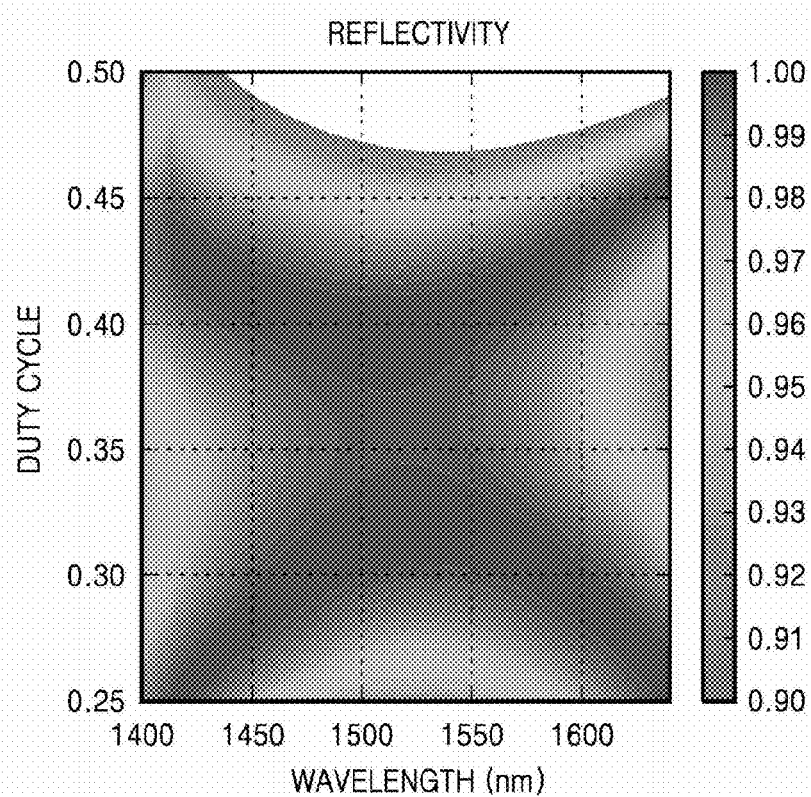
FIG. 3 is a graph of simulated reflectivity contour on each wavelength according to duty cycles of sub-wavelength reflecting units.
Figure 4:
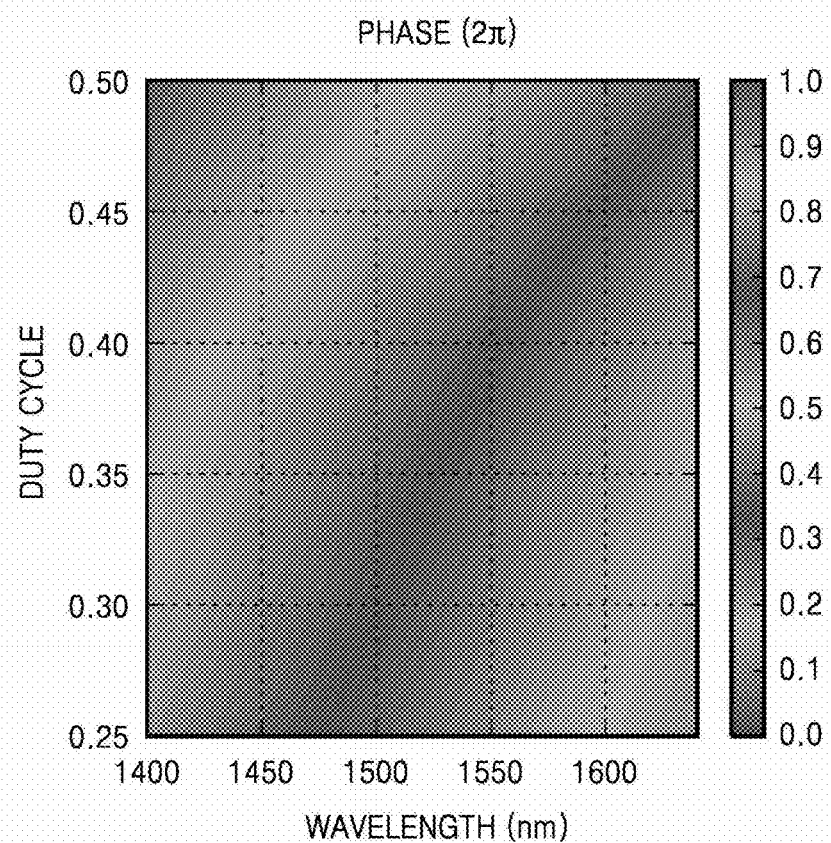
FIG. 4 is a graph of reflection phases on wavelengths according to duty cycles of sub-wavelength reflecting units.

FIG. 3 is a graph of simulated reflectivity contour on each wavelength according to duty cycles of sub-wavelength reflecting units. FIG. 4 is a graph of reflection phases on wavelengths according to duty cycles of sub-wavelength reflecting units.

Referring to FIG. 3, the x-axis represents wavelength of corresponding light, and the y-axis represents duty cycles of sub-wavelength reflecting units. Colors of the graph indicate reflectivity at corresponding values (wavelengths, or duty cycles). For example, in order to determine a duty cycle of a sub-wavelength reflecting unit that transmits a resonance wavelength of 1,500 nm, in FIG. 3, when the x-axis is 1,500 nm, the duty cycle is in a range from 0.30 to 0.42, which is a region of a duty cycle close to the reflectivity of 1.00. When the reflectivity approaches 1.00, the quality factor of the Fabri-Perot resonator that includes a corresponding sub-wavelength reflecting unit is increased, and thus, a bandwidth may be narrowed.

Referring to FIG. 4, the x-axis represents wavelengths of light, the y-axis represents duty cycles of sub-wavelength reflecting units, and colors of the graph indicate reflection phases at corresponding values (wavelengths or duty cycles). Based on a range of the duty cycle determined in FIG. 3, in FIG. 4, duty cycles of the first sub-wavelength reflecting unit and the second sub-wavelength reflecting unit respectively may be determined by finding phase change combinations $\varphi_{1i}$ and $\varphi_{2i}$ that satisfy Equation 2.

A relationship between duty cycle, reflectivity, and reflection phase may be obtained through an electromagnetic simulation. For example, the electromagnetic simulation may use a rigorous coupled-wave analysis (RCWA) technique.

Figure 5:
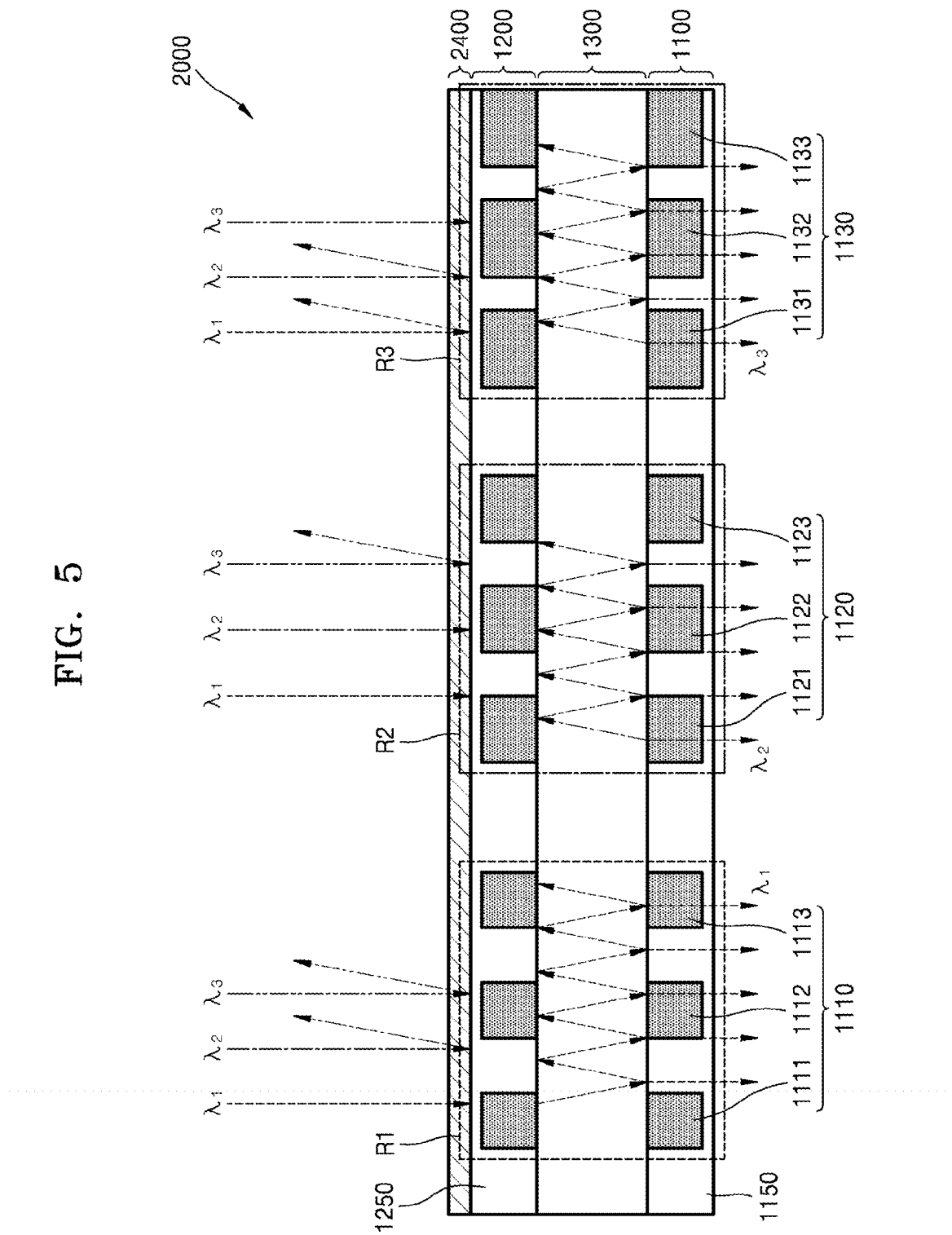
FIG. 5 is a schematic cross-sectional view of an on-chip optical filter according to another exemplary embodiment.

FIG. 5 is a schematic cross-sectional view of an on-chip optical filter 2000 according to another exemplary embodiment. The on-chip optical filter 2000 has a configuration substantially similar to that of the on-chip optical filter 1000 except for a polarizing filter 2400 provided on the first SWG reflecting layer 1100 and the second SWG reflecting layer 1200, and thus the description thereof will not be repeated.

The polarizing filter 2400 may be provided on a surface through which light enters the on-chip optical filter 2000. For example, the polarizing filter 2400 may be provided on the first SWG reflecting layer 1100 or the second SWG reflecting layer 1200 according to a direction of incident light.

The polarizing filter 2400 may transmit only a first polarizing direction component set in advance of light, and may reflect other components of the light. For example, when the first SWG reflecting layer 1100 and the second SWG reflecting layer 1200 have a bar shape elongated in a direction, the first polarizing direction may be parallel to the elongation direction of the first SWG reflecting layer 1100 and the second SWG reflecting layer 1200.

Figure 6:
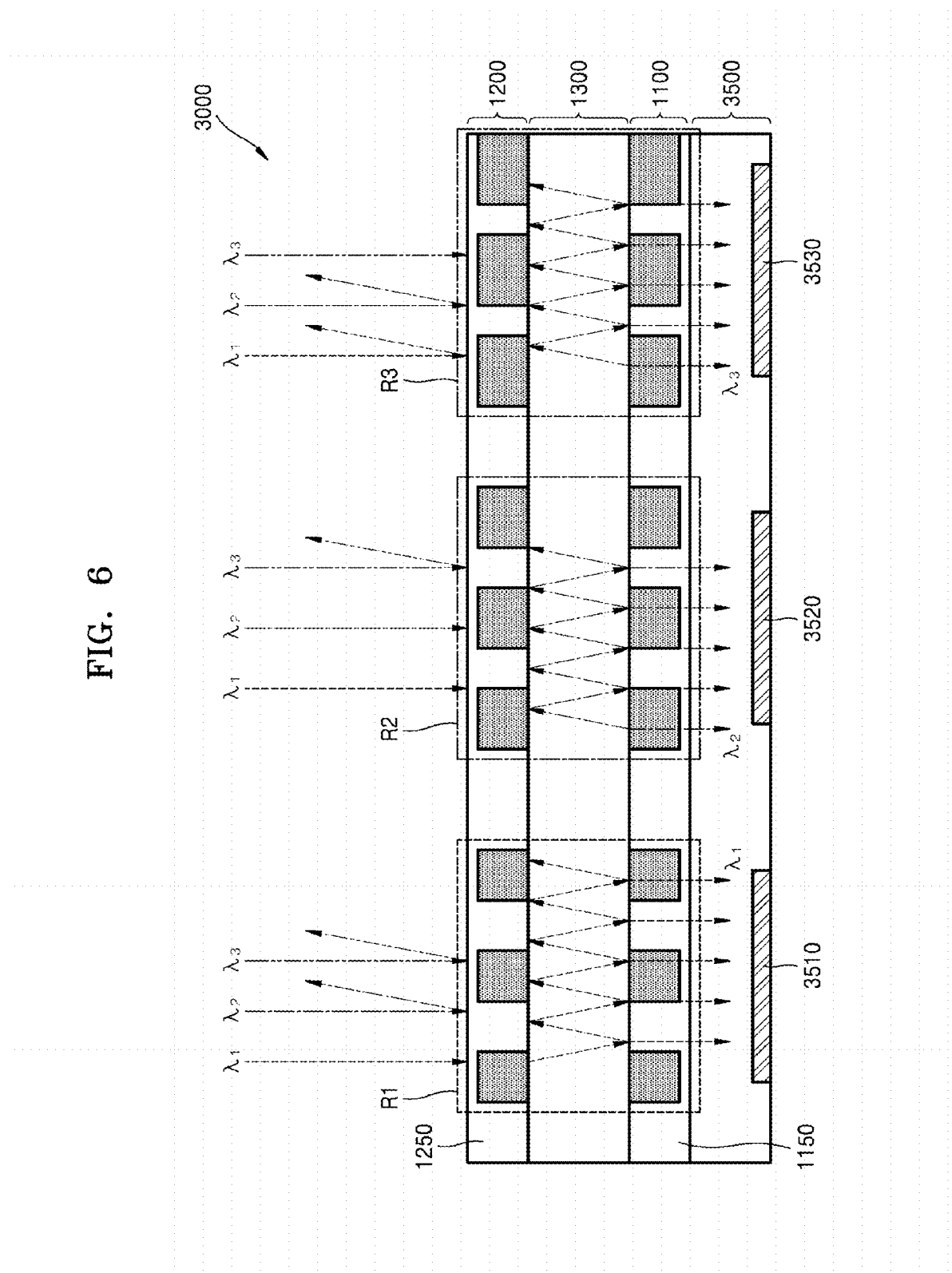
FIG. 6 is a schematic cross-sectional view of a spectrometer according to an exemplary embodiment.

FIG. 6 is a schematic cross-sectional view of a spectrometer 3000 according to an exemplary embodiment. The spectrometer 3000 may include the on-chip optical filter 1000 of FIG. 1, and thus, the description thereof will not be repeated.

The spectrometer 3000 may include the on-chip optical filter 1000 and a sensor layer 3500 that receives light that passes through the on-chip optical filter 1000 for each wavelength. The sensor layer 3500 may include a plurality of sensors 3510, 3520, and 3530 respectively corresponding to a plurality of Fabri-Perot resonators R1, R2, and R3. For example, the sensor layer 3510 may measure an intensity of light having a resonance wavelength $\lambda_1$ passing through the Fabri-Perot resonator R1. For example, the sensor layer 3520 may measure an intensity of light having a resonance wavelength $\lambda_2$ passing through the Fabri-Perot resonator R2. For example, the sensor layer 3530 may measure an intensity of light having a resonance wavelength $\lambda_3$ passing through the Fabri-Perot resonator R3.

The sensors 3510, 3520, and 3530 may be general light receiving sensors. For example, the sensors 3510, 3520, and 3530 may be complementary metal oxide semiconductor (CMOS) image sensors, or charge coupled device (CCD) image sensors. The intensities of each of the wavelengths $\lambda_1$, $\lambda_2$, and $\lambda_3$ of light received by the sensors 3510, 3520, and 3530 may be transmitted to a controller. The spectrometer 3000 may have an on-chip structure, and may be used as a small spectrometer of a chip unit. The spectrometer 3000 may further include the polarizing filter 2400 (refer to FIG. 5) as necessary.

Figure 7:
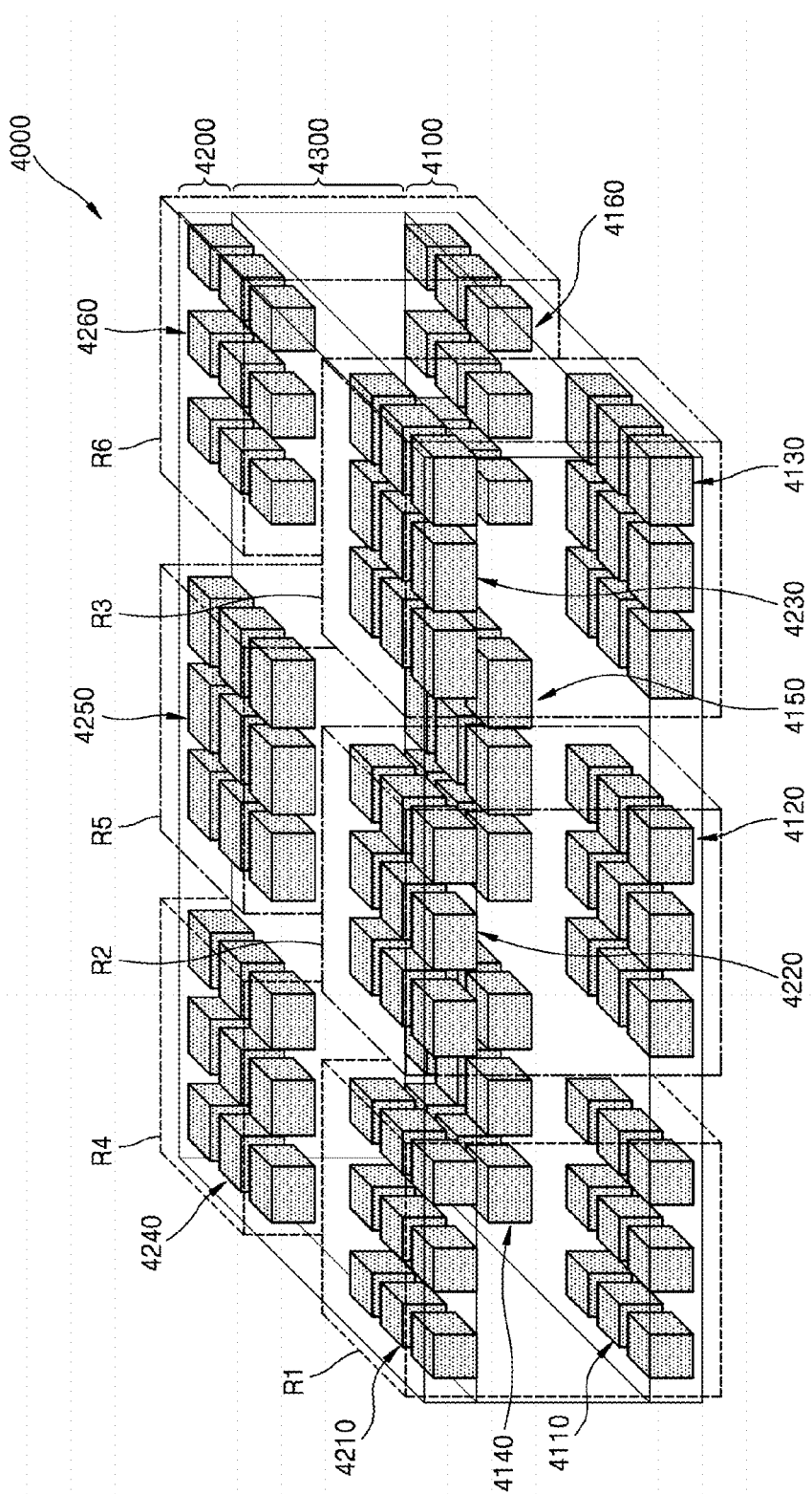
FIG. 7 is a schematic perspective view of an on-chip optical filter according to another exemplary embodiment.

FIG. 7 is a schematic perspective view of an on-chip optical filter 4000 according to another exemplary embodiment. Referring to FIG. 7, the on-chip optical filter 4000 may include a first SWG reflecting layer 4100 and a second SWG reflecting layer 4200 facing the first SWG reflecting layer 4100.

The on-chip optical filter 4000 may include a plurality of Fabri-Perot resonators R1, R2, R3, R4, R5, and R6 formed by the first SWG reflecting layer 4100 and the second SWG reflecting layer 4200 facing each other. The Fabri-Perot resonators R1, R2, R3, R4, R5, and R6 may be two dimensionally arranged.

The first SWG reflecting layer 4100 may include a plurality of first sub-wavelength reflecting units 4110, 4120, 4130, 4140, 4150, and 4160. Referring to FIG. 7, six first sub-wavelength reflecting units 4110, 4120, 4130, 4140, 4150, and 4160 are depicted as an example, but various numbers of first sub-wavelength reflecting units may be provided according to design.

The first sub-wavelength reflecting units 4110, 4120, 4130, 4140, 4150, and 4160 may be two dimensionally arranged in the first SWG reflecting layer 4100. Also, each of the first sub-wavelength reflecting units 4110, 4120, 4130, 4140, 4150, and 4160 may include a plurality of two dimensionally arranged first reflectors. The first reflectors may be arranged to satisfy the sub-wavelength grating conditions, and may have a higher reflectivity with respect to surrounding units. The sub-wavelength grating conditions, the first reflectors, and the surrounding units are described with reference to FIG. 1, and thus, the descriptions thereof will not be repeated.

The second SWG reflecting layer 4200 may include a plurality of second sub-wavelength reflecting units 4210, 4220, 4230, 4240, 4250, and 4260. The second sub-wavelength reflecting units 4210, 4220, 4230, 4240, 4250, and 4260 respectively may be arranged to face the first sub-wavelength reflecting units 4110, 4120, 4130, 4140, 4150, and 4160.

The second sub-wavelength reflecting units 4210, 4220, 4230, 4240, 4250, and 4260 may be two dimensionally arranged in the second SWG reflecting layer 4200. Also, each of the second sub-wavelength reflecting units 4210, 4220, 4230, 4240, 4250, and 4260 may include a plurality of two dimensionally arranged second reflectors. The second reflectors may be arranged to satisfy the sub-wavelength grating conditions, and may have a higher reflectivity with respect to surrounding units. The sub-wavelength grating conditions, the second reflectors, and the surrounding units are described with reference to FIG. 1, and thus, the descriptions thereof will not be repeated.

The first sub-wavelength reflecting units 4110, 4120, 4130, 4140, 4150, and 4160 and the second sub-wavelength reflecting units 4210, 4220, 4230, 4240, 4250, and 4260 that are facing each other may form the Fabri-Perot resonators R1, R2, R3, R4, R5, and R6 by facing each other.

Figure 8:
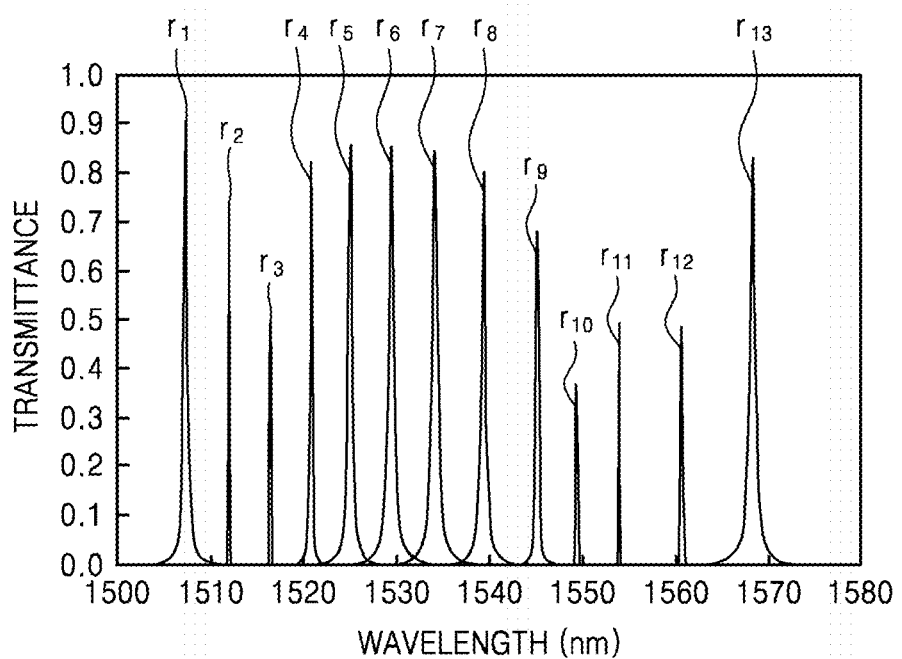
FIG. 8 is a graph illustrating a simulation result of the on-chip optical filter according to the exemplary embodiment.

Resonance wavelengths of the Fabri-Perot resonators R1, R2, R3, R4, R5, and R6 may be determined according to duty cycles, grating types, thicknesses, and reflectivity of the first sub-wavelength reflecting units 4110, 4120, 4130, 4140, 4150, and 4160 and the second sub-wavelength reflecting units 4210, 4220, 4230, 4240, 4250, and 4260. The descriptions thereof are the same as the descriptions of the Fabri-Perot resonator R1, R2, and R3 with reference to FIG. 1, FIG. 8 is a graph illustrating a simulation result of the on-chip optical filter according to the exemplary embodiment. Referring to FIG. 8, the x-axis represents wavelengths of light, and the y-axis represents reflectivity.

The on-chip optical filter used for the current simulation may include 13 Fabri-Perot resonators r1, r2, r3, r4, r5, r6, r7, r8, r9, r10, r11, r12, and r13 respectively having wavelengths in a range from 1500 nm to 1580 nm. FIG. 8 shows reflectivity of light transmitted through the on-chip optical filter when flat light having a constant intensity of a band width in a range of 1550 nm to 1580 nm is emitted to the on-chip optical filter in a perpendicular direction to the on-chip optical filter. According to the simulation result, the on-chip optical filter according to the current exemplary embodiment has a narrow bandwidth of a range of a few nanometers based on each resonance wavelength, and thus, may have a high filtering performance.

In the on-chip optical filter having a Fabri-Perot resonator and the spectrometer according to the current exemplary embodiment, a plurality of Fabri-Perot resonators may be formed and may transmit corresponding resonance wavelengths by including a first SWG reflecting layer in which a plurality of first sub-wavelength reflecting units are arranged and a second SWG reflecting layer in which a plurality of second sub-wavelength reflecting units are arranged.

An on-chip optical filter having Fabri-Perot resonators and the spectrometer according to the current exemplary embodiment may control resonance wavelengths by changing duty cycles of the first sub-wavelength reflecting units and the second sub-wavelength reflecting units.

The on-chip optical filter having Fabri-Perot resonators and the spectrometer according to the current exemplary embodiment may be manufactured by using a general semiconductor manufacturing process, and may be easily manufacture, and thus, the manufacturing cost may be reduced.

Descriptions of features or aspects within each exemplary embodiment should typically be considered as available for other similar features or aspects in other exemplary embodiments.

While on-chip optical filters having Fabri-Perot resonators and spectrometers according to the exemplary embodiment have been described with reference to the figures for facilitate understanding. The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An on-chip optical filter comprising:
a first sub-wavelength grating (SWG) reflecting layer comprising a plurality of first sub-wavelength reflecting units, each of the first sub-wavelength reflecting units comprising a plurality of first reflectors that are spaced apart from each other at a regular interval, a refractive index of the first reflectors being greater than a refractive index of a material surrounding the first reflectors, and the first reflectors having an arrangement satisfying a sub-wavelength grating condition; and
a second SWG reflecting layer comprising a plurality of second sub-wavelength reflecting units, each of the second sub-wavelength reflecting units comprising a plurality of second reflectors that are spaced apart from each other at a regular interval and spaced apart from the first SWG reflecting layer, a refractive index of the second reflectors being greater than a refractive index of a material surrounding the second reflectors, and the second reflectors having an arrangement satisfying the sub-wavelength grating condition;
wherein the plurality of first sub-wavelength reflecting units and the plurality of second sub-wavelength reflecting units are aligned to face each other and operate as a plurality of Fabri-Perot resonators,
wherein each of the Fabri-Perot resonators transmits light of a resonance wavelength set in advance,
wherein each first reflector is disposed across from a corresponding second reflector with a cavity layer between the each first reflector and the corresponding second reflector, and
wherein the sub-wavelength grating condition relates to a distance between two adjacent reflectors of the plurality of first reflectors and the plurality of second reflectors being less than a central wavelength of a transmission band of the on-chip optical filter.

2. The on-chip optical filter of claim 1, wherein when the Fabri-Perot resonators are distinguished by i, the first sub-wavelength reflecting units and the second sub-wavelength reflecting units that correspond to i and face each other one by one have duty cycles satisfying a following Equation:

$$(2*n_i*d_i)/\lambda_i + \Phi_{1i} + \Phi_{2i} = 2\pi*m$$

wherein, i represents an integer, $n_i$ represents a refractive index between the first sub-wavelength reflecting unit and the second sub-wavelength reflecting unit corresponding to i, $d_i$ represents a distance between the first sub-wavelength reflecting unit and the second sub-wavelength reflecting unit corresponding to i, $\lambda_1$ represents a resonance wavelength of a Fabri-Perot resonator corresponding to i, $\Phi_{1i}$ represents a reflection phase at a reflection surface of the first sub-wavelength reflecting unit corresponding to i, $\Phi_{2i}$ represents a reflection phase of the second sub-wavelength reflecting unit corresponding to i, and m represents an integer.

3. The on-chip optical filter of claim 2, wherein the first sub-wavelength reflecting units have different duty cycles from each other, and the second sub-wavelength reflecting units have different duty cycles from each other.

4. The on-chip optical filter of claim 1, wherein the first SWG reflecting layer and the second SWG reflecting layer are spaced apart from each other by a constant gap.

5. The on-chip optical filter of claim 1, wherein the first reflectors have a same thickness, and the second reflectors have a same thickness.

6. The on-chip optical filter of claim 5, wherein, when the Fabri-Perot resonators are distinguished by i, the first reflectors and the second reflectors corresponding to i satisfy following Equations:

$$2\lambda_i/3 \geq h_1 \geq \lambda_i/15$$

$$2\lambda_i/3 \geq h_2 \geq \lambda_i/15$$

wherein, i represents an integer, $h_1$ represents a thicknesses of the first reflectors, $h_2$ represents a thicknesses of the second reflectors, and $\lambda_i$ represents a resonance wavelength of a Fabri-Perot resonator corresponding to i.

7. The on-chip optical filter of claim 1, wherein the first sub-wavelength reflecting units are one dimensionally arranged, and the second sub-wavelength reflecting units are one dimensionally arranged.

8. The on-chip optical filter of claim 1, further comprising a polarizing filter on the first SWG reflecting layer or the second SWG reflecting layer.

9. The on-chip optical filter of claim 1, wherein the first sub-wavelength reflecting units are two dimensionally arranged and the second sub-wavelength reflecting units are two dimensionally arranged.

10. A spectrometer comprising:
an on-chip optical filter according to claim 1; and
a sensor layer configured to receive light passing through the on-chip optical filter for each wavelength.

11. An on-chip optical filter comprising:
a first sub-wavelength grating (SWG) reflecting layer comprising a plurality of first grating patterns that satisfy a sub-wavelength grating condition;
a second SWG reflecting layer that comprises a plurality of second grating patterns that satisfy the sub-wavelength grating condition, and is spaced apart from the first SWG reflecting layer, the plurality of second grating patterns being aligned with the plurality of first grating patterns to face each other to operate as Fabri-Perot resonators; and
a cavity layer between the first SWG reflecting layer and the second SWG reflecting layer,
wherein each first grating pattern is disposed across from a corresponding second grating pattern with the cavity layer disposed between the each first grating pattern and the corresponding second grating pattern, and
wherein the sub-wavelength grating condition relates to a distance between two adjacent reflectors of the plurality of first grating patterns and the plurality of second grating patterns being less than a central wavelength of a transmission band of the on-chip optical filter.

12. The on-chip optical filter of claim 11, wherein, when first gratings of the plurality of first grating patterns and second gratings of the plurality of second grating patterns that face each other one by one are distinguished by i, the first gratings and the second grating patterns satisfy a following:

$$(2*n_i*d_i)/\lambda_i + \Phi_{1i} + \Phi_{2i} = 2\pi*m$$

wherein, i represents an integer, n represents a refractive index of the cavity layer, d represents a thickness of the cavity layer, $\lambda_i$ represents a resonance wavelength of a Fabri-Perot resonator corresponding to i, $\Phi_{1i}$ represents a reflection phase at a reflection surface of the first grating pattern corresponding to i, $\Phi_{2i}$ represents a reflection phase of the second grating pattern corresponding to i, and m represents an integer.

13. The on-chip optical filter of claim 11, wherein the first gratings have different duty cycles from each other, and the second gratings have different duty cycles from each other.

14. The on-chip optical filter of claim 11, wherein the first gratings have a same thickness, and the second gratings have a same thickness.

15. The on-chip optical filter of claim 11, wherein the first gratings are one dimensionally arranged, and the second gratings are one dimensionally arranged.

16. The on-chip optical filter of claim 11, further comprising a polarizing filter on the first gratings or the second gratings.

17. The on-chip optical filter of claim 11, wherein the first gratings are two dimensionally arranged, and the second gratings are two dimensionally arranged.

18. A spectrometer comprising:
an on-chip optical filter according to claim 11; and
a sensor layer configured to receive light passing through the on-chip optical filter for each wavelength.

* * * * *